(12) United States Patent
Hutchinson et al.

(10) Patent No.: US 12,554,816 B2
(45) Date of Patent: Feb. 17, 2026

(54) SYSTEM AND METHOD FOR VERIFYING AN ORIGINATOR OF AN OBJECT USING A BIOMETRIC SIGNATURE

(71) Applicant: THALES DIS CPL USA, INC., Austin, TX (US)

(72) Inventors: Michael Hutchinson, Cedar Park, TX (US); Ramandeep Singh, Uttar Pradesh (IN); HongQian Karen Lu, Austin, TX (US)

(73) Assignee: THALES DIS CPL USA, INC., Austin, TX (US)

( * ) Notice: Subject to any disclaimer, the term of this patent is extended or adjusted under 35 U.S.C. 154(b) by 214 days.

(21) Appl. No.: 18/384,500

(22) Filed: Oct. 27, 2023

(65) Prior Publication Data
US 2025/0141682 A1    May 1, 2025

(51) Int. Cl.
*G06F 21/32*    (2013.01)
*H04L 9/30*    (2006.01)
*H04L 9/32*    (2006.01)

(52) U.S. Cl.
CPC .............. *G06F 21/32* (2013.01); *H04L 9/30* (2013.01); *H04L 9/3263* (2013.01)

(58) Field of Classification Search
None
See application file for complete search history.

(56) References Cited

U.S. PATENT DOCUMENTS

| | | | |
|---|---|---|---|
| 10,719,593 B2* | 7/2020 | Kaga | G06F 21/32 |
| 10,785,032 B1 | 9/2020 | Griffin et al. | |
| 2012/0278614 A1* | 11/2012 | Choi | H04W 12/068 713/173 |
| 2016/0117492 A1* | 4/2016 | Chabanne | G06F 21/32 726/19 |
| 2016/0127353 A1* | 5/2016 | Thomas | H04L 9/006 713/156 |
| 2020/0185864 A1 | 6/2020 | Bischoff et al. | |

FOREIGN PATENT DOCUMENTS

JP    2018007011 A1    1/2018

OTHER PUBLICATIONS

International Search Report (PCT/ISA/210) and Written Opinion (PCT/ISA/237) mailed on Dec. 6, 2024, by the European Patent Office as the International Searching Authority for corresponding International Application No. PCT/EP2024/052481—[16 pages].

* cited by examiner

*Primary Examiner* — Bradley W Holder

(57) ABSTRACT

A system and method (400, 600, 700, 900, 1100, 1200) of verifying an originator of an object using a biometric operation can include the steps of requesting (400, A) a biometric certificate from an enrollment service, capturing and receiving (400, C, D) a biometric reading associated with a user, transforming (400, E, F, G) the biometric reading into a format that can be made public, and creating (400, I, J) a user's certificate containing the public biometric data.

17 Claims, 12 Drawing Sheets

700

1000

SYSTEM AND METHOD FOR VERIFYING AN ORIGINATOR OF AN OBJECT USING A BIOMETRIC SIGNATURE

CROSS-REFERENCE TO RELATED APPLICATIONS

Not applicable.

TECHNICAL FIELD

The present disclosure generally relates to verification of an originator of an object or certificate. More particularly, but not exclusively, the present disclosure relates to the addition of biometric facilities within document identity authorship authentication.

BACKGROUND

Issuance of documents assure some level of achievement of the person, such as an educational test or driver license. Where these have transitioned from paper copies to electronic versions, they are typically signed by an issuing authority using PKI based mechanisms. Historically, these have utilized password or PIN based "what you know" authorization techniques to allow signatures to be associated. The introduction of biometric verification "what you are" add multifactor authentication (MFA) to the authorization flow.

Traditional biometric based electronic signature-based mechanisms generally utilize PKI that is authenticated via a local biometric to release a key for usage with signings and decryptions.

All of the subject matter discussed in the Background section is not necessarily prior art and should not be assumed to be prior art merely as a result of its discussion in the Background section. Along these lines, any recognition of problems in the prior art discussed in the Background section or associated with such subject matter should not be treated as prior art unless expressly stated to be prior art. Instead, the discussion of any subject matter in the Background section should be treated as part of the inventor's approach to the particular problem, which, in and of itself, may also be inventive.

SUMMARY

The herein presented technology provides an improved mechanism for identifying an originator of an object, such as a qualification certificate, based upon data that is embedded within the object itself. The aforementioned data is derived from the originator's biometric that can be made public without exposing personal identifiable information. The presented technology is an improved method as it provides direct identification of the originator (also called user) associated with the object.

Current electronic signature-based solutions perform cryptographic algorithms by having the user attest that they are the originator by using either a PIN or Password (the "what you know" factor) or local biometric (the "who you are" factor) to unlock a signature key. If the PIN is shared with others, then the signature no longer represents just the original signer; equally for biometrics—if the key allows multiple biometrics to be enrolled for unlock, e.g., Same user Left Index and Right thumb then more than the originator can be enrolled e.g., User 1 Left Index and User 2 Right Index.

The embodiments provide a mechanism to prevent people other than the original signer to verify that signature.

In some embodiments, a method of verifying an originator of an object using a biometric operation can include requesting a biometric certificate from an enrollment service, capturing and receiving a biometric reading associated with a user, transforming the biometric reading into a format that can be made public, and creating a user's certificate containing the public biometric data.

In some embodiments, the user certificate is verified by a verification service (or authority) by performing the operations of presenting the user's certificate to the verification service (or verification authority), capturing and receiving a biometric reading associated with the user, transforming the biometric reading into a format that can prove the validity of the public biometric data, and verifying the originator of the certificate if a proof is made with the public biometric data.

In some embodiments, the user provides addition personal information for the certificate that further identifies the requester of the certificate. In some embodiments, the user additional personal information is added to the issued certificate.

In some embodiments, the user performs some work that generates some work product. In some embodiments, the user's work product is assessed by a testing service, and the result added within a signed result certificate. In some embodiments, the user's work product is associated with a certificate of completion and designation of merit.

In some embodiments, the verification authority obtains the user's current biometrics and converts them into a format that proves the validity of the public biometric data embedded in the user's certificate.

In some embodiments, converting the biometric data further includes generating a key pair from the biometric.

In some embodiments, converting the biometric data further includes generating a privacy preserving biometric public ID from the biometric.

In some embodiments, converting the biometric data further includes generating a privacy preserving biometric cryptographic key from the biometric.

In some embodiments, the biometric reading captured and received is any capturable biometric including one or more among fingerprints, facial recognition, voice print, palm print, iris capture, or keystroke sequence captured securely during an examination of the user.

In some embodiments, the biometric public data is embedded with the test result to generate a signed result certificate. In some embodiments, the signed result certificate further includes a QR code that allows access to the secure content upon scanning.

In some embodiments, the method includes converting the biometric reading to biometric public data, receiving a password to generate a key, using the key to encrypt any personally identifiable information to provide encrypted personally identifiable information.

In some embodiments, the method includes proving the biometric, receiving a password to generate a key, using the key to decrypt any encrypted personally identifiable information to provide personally identifiable information.

In some embodiments, a system of verifying an originator of an object using a biometric signature can include one or more processors and memory coupled to the one or more processors, where the memory includes computer instructions which when executed by the one or more processors causes the one or more processors to perform certain operations. The operations can include the operations requesting a biometric certificate from an enrollment service, capturing and receiving a biometric reading associated with a user, transforming the biometric reading into a format that can be made public, and creating a user's certificate containing the public biometric data.

In some embodiments, the system includes the user certificate which is verified by a verification service by performing the operations of presenting the user's certificate to the verification service, capturing and receiving a biometric reading associated with the user, transforming the biometric reading into a format that can prove the validity of the public biometric data, and verifying the originator of the certificate if a proof is made with the public biometric data.

In some embodiments, the verification service obtains the user's current biometrics and converts them into a format that proves the validity of the public biometric data embedded in the user's certificate.

In some embodiments, the one or more processors are further configured convert the biometric data by generating a key pair from the biometric.

BRIEF DESCRIPTION OF THE DRAWINGS

Non-limiting and non-exhaustive embodiments are described with reference to the following drawings, wherein like labels refer to like parts throughout the various views unless otherwise specified. The sizes and relative positions of elements in the drawings are not necessarily drawn to scale. For example, the shapes of various elements are selected, enlarged, and positioned to improve drawing legibility. The particular shapes of the elements as drawn have been selected for ease of recognition in the drawings. One or more embodiments are described hereinafter with reference to the accompanying drawings in which.

DETAILED DESCRIPTION

Figure 1:
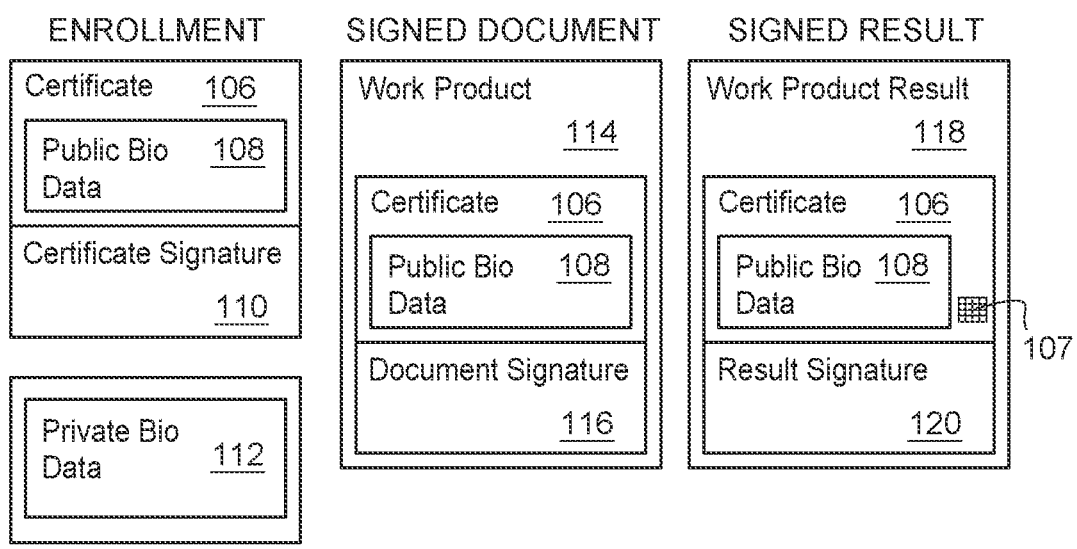
FIG. 1 is an illustration of various certificates that embed the public biometric data within them during the enrollment, work signing and result situations in accordance with the embodiments.

In the following detailed description, reference is made to the accompanying drawings that show, by way of illustration, specific embodiments in which the embodiments may be practiced. These embodiments are described in sufficient detail to enable those skilled in the art to practice the invention. It is to be understood that the various embodiments of the invention, although different, are not necessarily mutually exclusive. For example, a particular feature, structure, or characteristic described herein in connection with one embodiment may be implemented within other embodiments without departing from the spirit and scope of the embodiments. In addition, it is to be understood that the location or arrangement of individual elements within each disclosed embodiment may be modified (or arranged in a different order) without departing from the spirit and scope of the embodiments. The following detailed description is, therefore, not to be taken in a limiting sense, and the scope of the present embodiments is defined only by the appended claims, appropriately interpreted, along with the full range of equivalents to which the claims are entitled. In the drawings, like numerals refer to the same or similar functionality throughout the several views.

The following description includes references to various methods executed by a processor of an integrated circuit chip. As is common in the field, there may be phrases herein that indicate these methods or method steps are performed by software instructions or software modules. As a person skilled in the art knows, such descriptions should be taken to mean that a processor, in fact, executes the methods, software instructions, and software modules.

The herein described technology provides a mechanism for enhancing access.

FIG. 1 illustrates sample certificates 100 including enrollment certificate 106, document certificate 114 and result certificate 118. Standard PKI based certificate enrollment with a Certificate Authority includes the Public Biometric Data 108. The certificates are signed 110, 116, 120 as part of the issuing process to ensure integrity. The Public Biometric Data 108 can be generated using a variety of functions.

Figure 4:
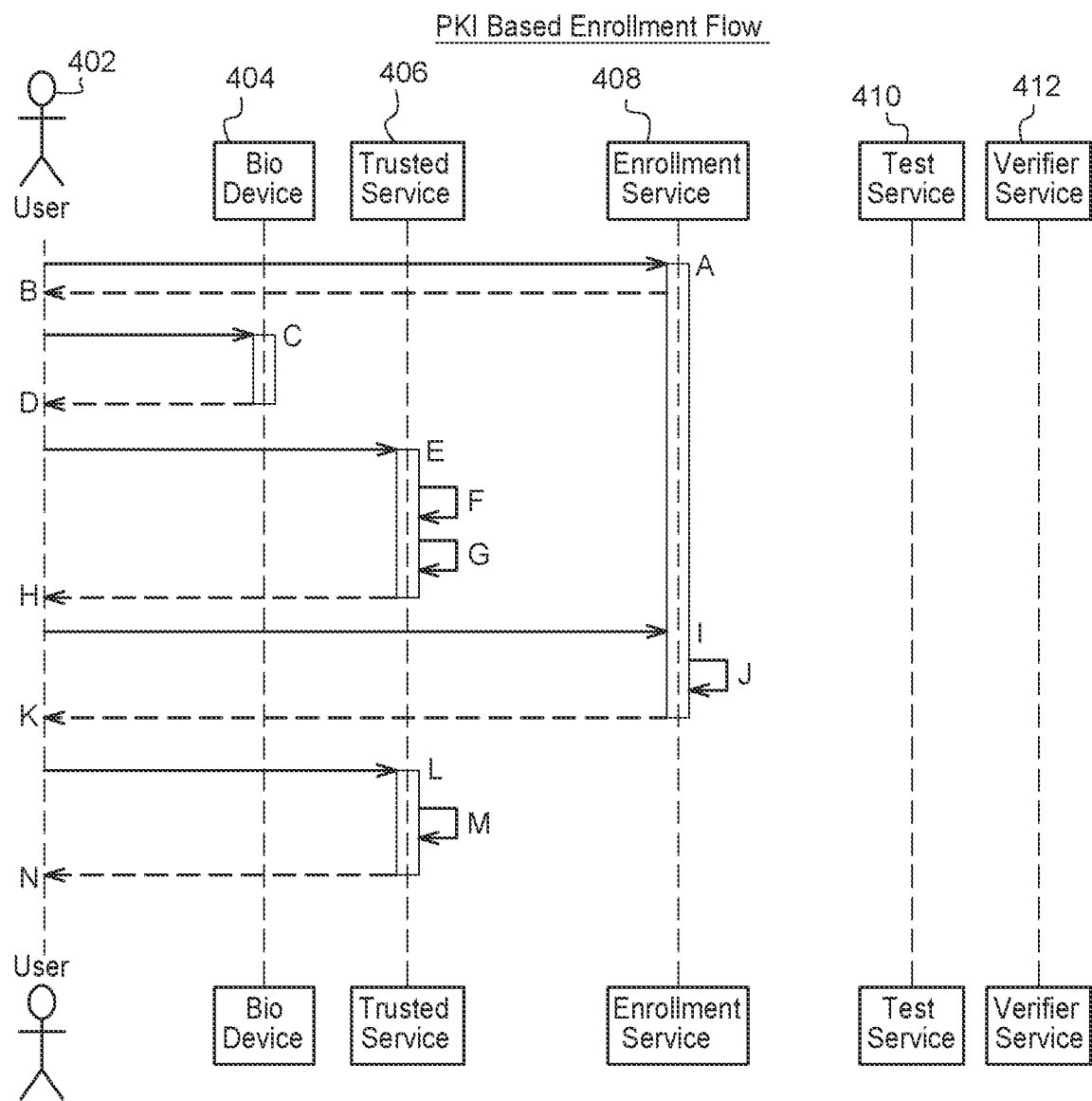
FIG. 4 is an illustration of the PKI based enrollment flow in accordance with the embodiments.

In one embodiment FIG. 4 illustrates an enrollment flow 400 that requires the biometric data to be transformed into a key pair—the public key is the Public Biometric Data and is used in place of randomly generated values. The Private Bio Data 112 is used within the mechanism that issues a certificate from the Certificate Authority using a certificate request. Then it is destroyed. It is recreated from the user biometric whenever it is required as in the flows 500 or 600 in FIGS. 5 & 6.

Figure 7:
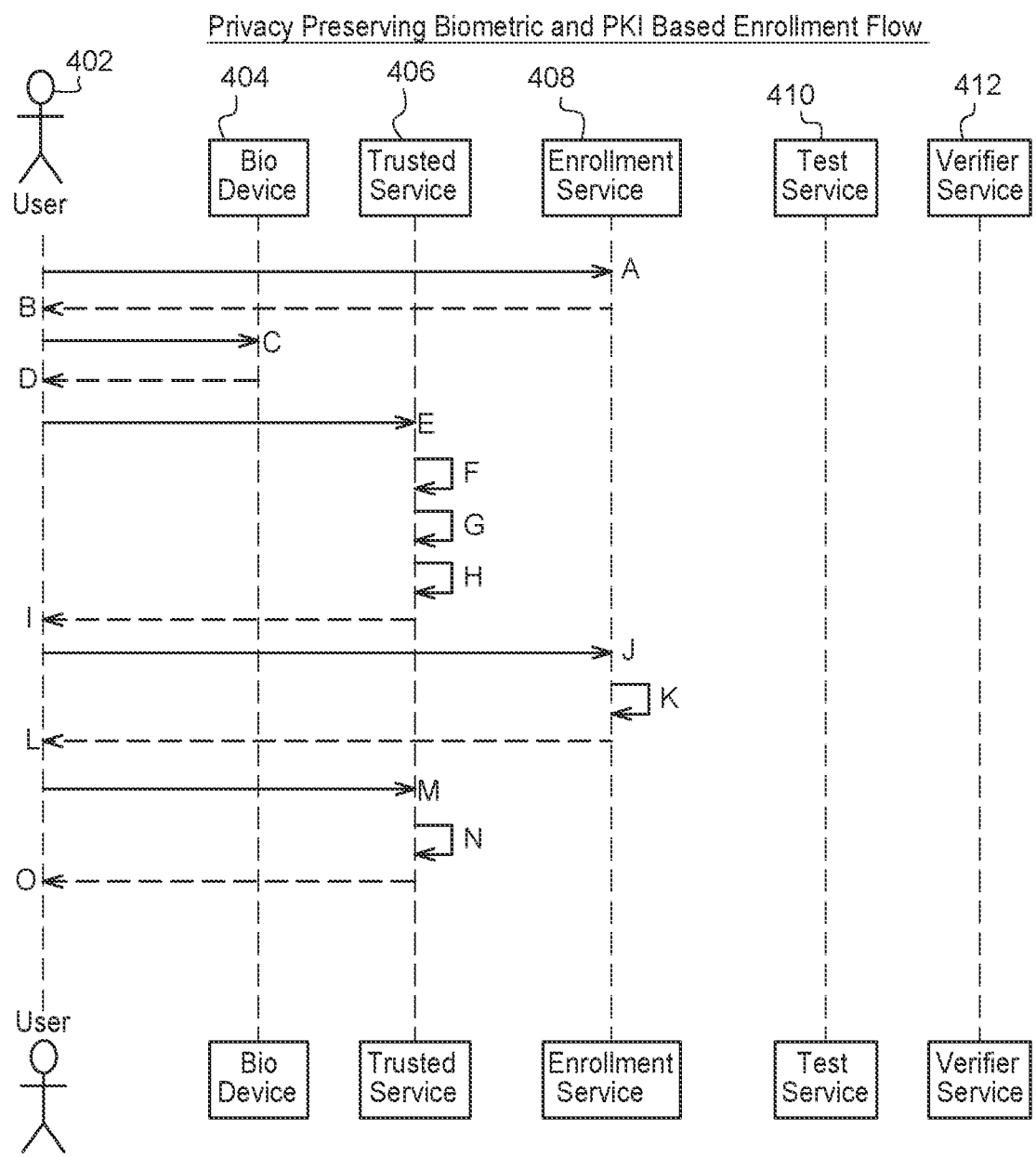
FIG. 7 is an illustration of a privacy preserving biometric and PKI based enrollment flow in accordance with the embodiments.

In an alternate embodiment as shown in FIG. 7, an enrollment flow 700 requires the biometric data to be transformed into a privacy preserving biometric value and the privacy preserving biometric value is placed within an extension attribute of the Certificate Authority within a certificate request. The certificate generation makes use of randomly generated key pair values from the trusted service. The Private Bio Data 112 is not used within a certificate request. It is destroyed. It is recreated from the user biometric whenever a verification is required.

Figure 10:
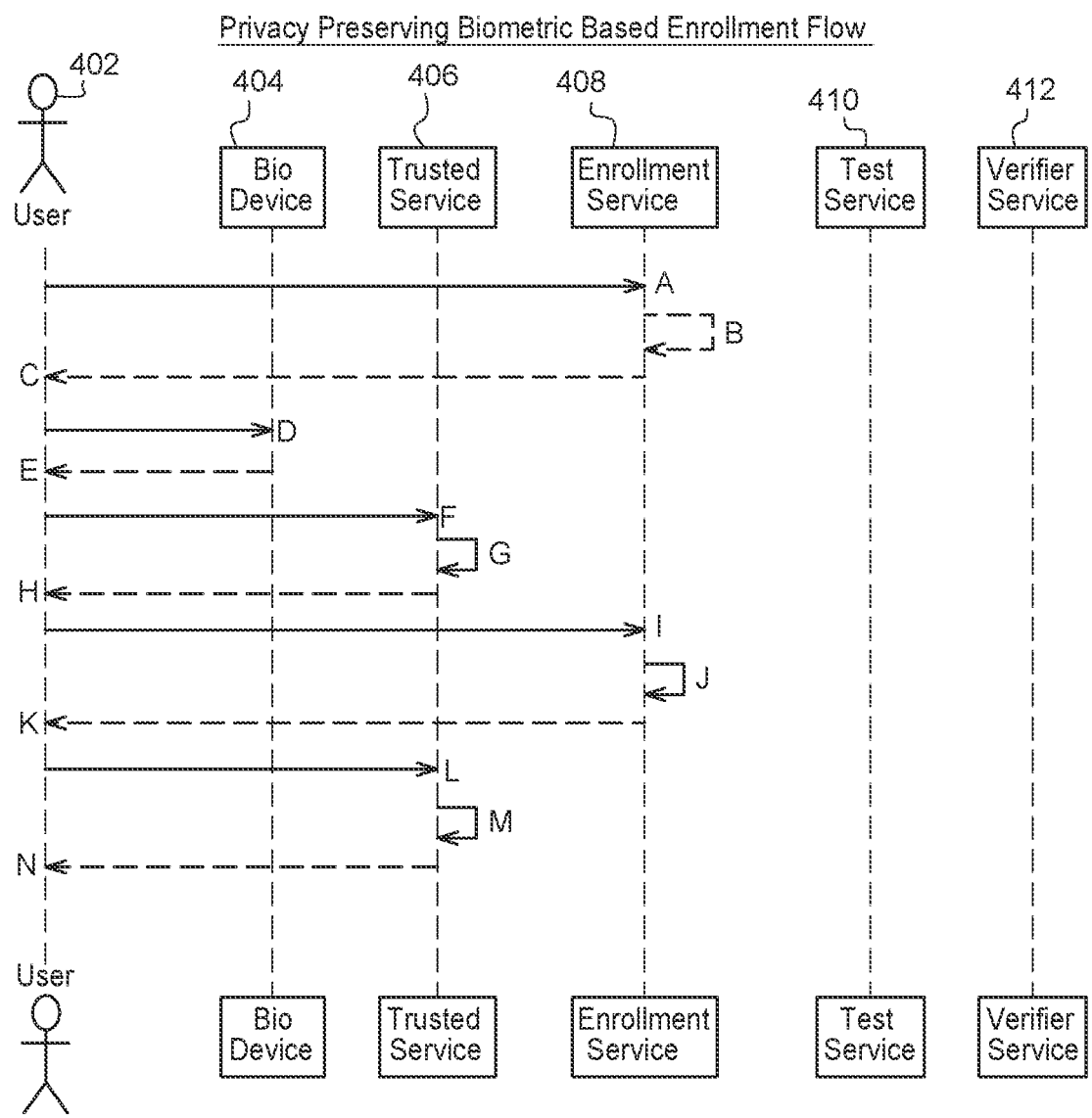
FIG. 10 is an illustration of the privacy preserving biometric based enrollment flow in accordance with the embodiments.

In yet another alternate embodiment FIG. 10 has a flow 1000 that requires the biometric data to be transformed into a privacy preserving biometric value where the privacy preserving biometric value is placed within an extension attribute of the Certificate Authority within a certificate request. The certificate generation makes use of randomly generated key pair values from the enrollment service. The Private Bio Data 112 is not used within a certificate request. It is destroyed. It is recreated from the user biometric whenever a verification is required.

Figure 2:
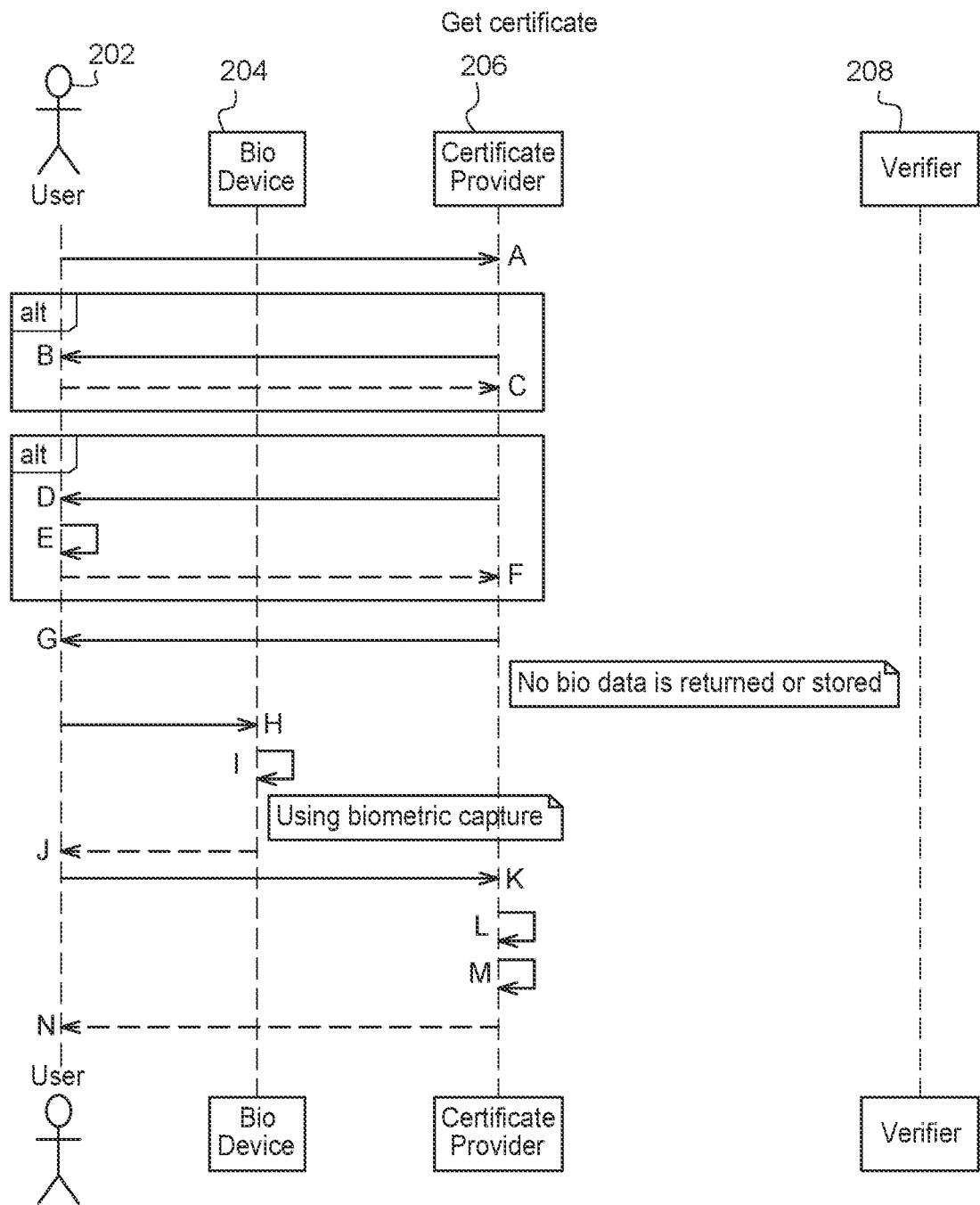
FIG. 2 is an illustration of the simplified enrollment flow where the enrollment provider supports both enrollment and testing services in accordance with the embodiments.

FIG. 2 is an illustration of an implementation or flow 200 for getting a certificate containing public biometric data. The user 202 registers for a certificate from the Certificate Provider 206. Optionally, the user is asked for and provides specific user information not related to the biometric data to fill in the Certificate Signing Request (CSR) as needed by the Certificate Provider. Optionally, the user is asked to perform some work, e.g., take a final examination, SAT, LSAT, drivers test etc. and provide the result of the work to the Certificate Provider. The user is asked for and provides the public data that gets included in the certificate via a biometric capture device 204. The Certificate Provider uses both required and optional data together within Certificate Signing Request and generates a signed biometric certificate. The biometric certificate is returned to the user. A verifier 208 is used later as further discussed with reference to FIG. 3 and other figures. In some embodiments, the biometric public data is embedded with the test result to generate a signed result certificate. In some embodiments, the signed result certificate further includes a QR code 107 (as shown in FIG. 1) that allows access to the secure content upon scanning.

Below is a more detailed description of the flow diagram 200 of FIG. 2 to get a certificate where a user 202 initially registers for a certificate at step A with a request to the certificate provider 206. The certificate provider 206 asks for the user information at step B and the user 202 then provides the user information at step C. In some embodiments, the flow further includes "work", e.g., an exam or test, for the certificate which can include a request from the certificate provider 206 to do the work for the certificate at step D, and/or doing hard under supervision by the user at step E and providing the result from the user 202 to the certificate provider at step F.

At step G, the certificate provider 206 requests and attempts to obtain public data using the biometric device 204. In some embodiments, no biometric data is returned or stored. In some embodiments, the biometric device 204 gets the public data at step H and further calculates the public data at step I. In some embodiments, the biometric device 204 requests public data of the user and the user provides the public data to the certificate provider 206 at step K which involves creating a certificate with public data and optional user information, and step L which provides the result of the work (e.g., test) and examination of result of work (grade). The certificate provider 206 can then sign the certificate at step M and send it to the user 202 at step N.

Figure 3:
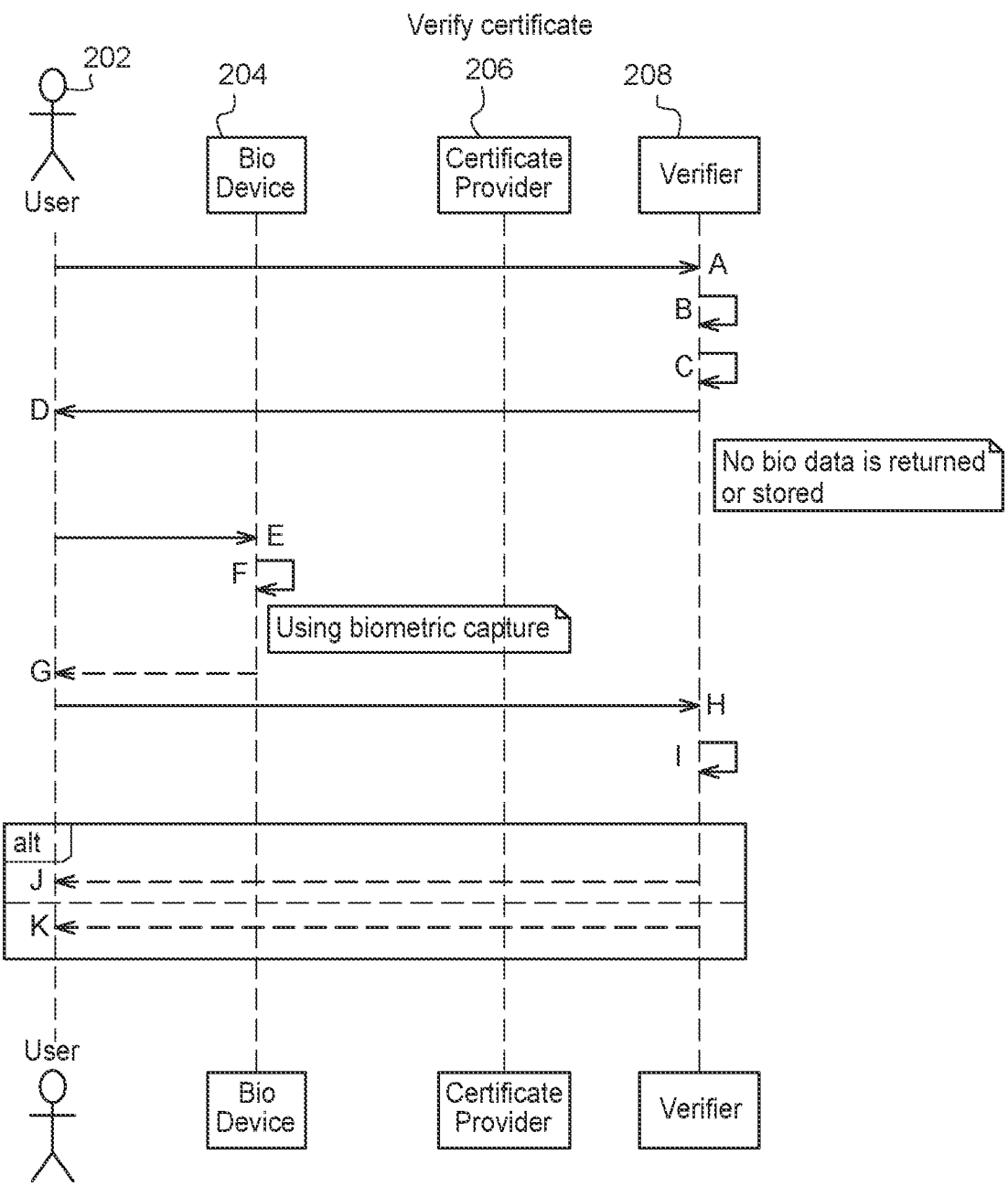
FIG. 3 is an illustration of the simplified verification flow in accordance with the embodiments.

FIG. 3 is an illustration of an implementation or flow 300 for verifying a certificate containing public biometric data. The user 202 provides their certificate to the Verifier 208. The Verifier 208 examines the entire certificate trust chain for validity. If successful, the Verifier 208 asks the user 202 to provide proof that the associated Certificate Public Biometric Data is indeed theirs. The user 202 provides the proof via a biometric capture device 204 to the Verifier 208. The Verifier 208 determines if the proof is sufficient to verify or not and returns either a verified or rejected state to the user 202.

Below is a more detailed description of the flow diagram 300 of FIG. 3 to verify a certificate where a user 202 initially sends the certificate at step A to a verifier 208. The verifier 208 can then verify the certificate signer at step B and verify the certificate signature at step C before requesting the user at step D that they are the originator using a biometric device 204. In some embodiments, no biometric data is returned or stored.

In some embodiments, the user 202 requests proof of private data from the biometric device 204 at step E and the biometric device calculates the private data proof at step F using biometric capture. The private data proof is then sent to the user 202 at step G and the user 202 in turn provides the private data proof to the verifier at step H. The verifier 208, at step I, determines if the certificate is verified or rejected based on the private data proof. In some embodiments, the verifier 208 will send notice that the certificate is verified at step J or that the certificate is rejected at step K as shown.

FIG. 4 is an illustration of an implementation or flow 400 of enrollment using biometric to key pair transformation using a smart card as the trusted storage mechanism. The user 402 requests enrollment to the Enrollment Service 408 at Step A. The Enrollment Service 408 requests a Certificate Signing Request (CSR) at step B that includes a biometric component from the user 402. The user scans their biometric on a Biometric Scanner or device 404 at Step C which returns a Biometric Template to the user at Step D. The Biometric Template is provided to a trusted service 406, e.g., a smart card at Step D that implements the Biometric Template to key pair algorithm, to generate the key pair (KP) public key (KPPuK) and private key (KPPrK) at Step F. This innovation does not provide or claims these algorithms, but many are published online. The Trusted Service creates a Certificate Signing Request (CSR) embedding the biometric public key (KPPuK) and signs it with the biometric private key (KPPrK) at Step G and returns the CSR using the Biometric Template at Step H. The Trusted Service 406 deletes the Biometric Template and the biometric private key. The Certificate Signing Request (CSR) is transferred to the Enrollment Service 408 at Step I. The Enrollment Service 408 issues the biometric-based user certificate (UC) at Step J and returns the US to the user 402 at Step K for storage at Step L within the Trusted Service 406, e.g., smart card. The trusted service 406 can then confirm the UC storage at Step M. Other figures will further illustrate the test service 410 and verifier service 412 shown.

Figure 5:
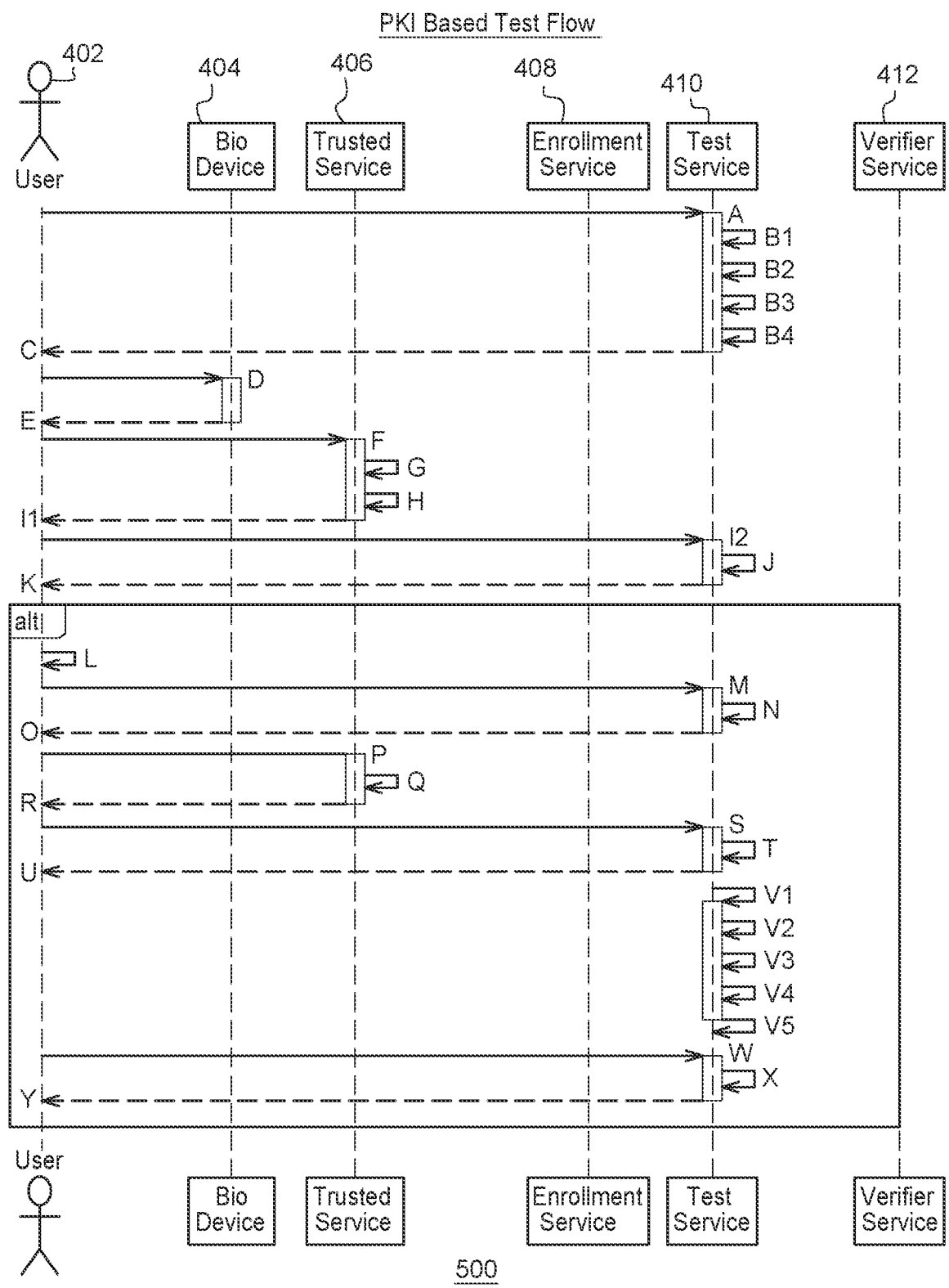
FIG. 5 is an illustration of the PKI based test flow in accordance with the embodiments.

FIG. 5 is an illustration of an implementation or flow 500 of work testing using biometric to key pair transformation. Before the user 402 does some work at the Test Service 410, they need to verify that they are the person registered to do that work. The user 402 at Step A presents their User Certificate (UC) to the Test Service 410. The Test Service 410 examines the entire certificate trust chain for validity at Step B1. The Test service 410 at Step B2 also extracts the public key from the UC. If successful, the Test Service 410 generates a challenge at Step B3 and encrypts it at Step B4 with the user's public key (KPPuK) extracted from the UC and asks the user 402 at step C to provide proof that they have the associated private key (KPPrK), by decrypting the challenge value and returning it. The user 402 scans their biometric at Step D on a Biometric Scanner 404 which returns a Biometric Template to the User 402 at Step E. The Biometric Template is provided to a Trusted Service 406 at Step F which creates a biometric cryptographic key (KPPrK) from the biometric template using the key pair generation algorithm at Step G. The Trusted Service 406 decrypts the challenge at Step H using the KPPrK and returns the decrypted challenge (DC) to the Test Service 410 at Step I1 and I2 for comparison. The Test Service 410 at J compares the generated challenge (GC) and the decrypted challenge (DC) to determine if the user is valid. The decision is returned to the user at Step K. If the user 402 is verified, then they can do the work. The user does some work, e.g., take a test, (at Step L) and provides the test work product (T) to the Test Service 410 at Step M. The Test Service 410 persists the T and UC in a database (DB) and generates a hash of T and UC (HTUC) at Step N to be signed by the user at Step O to create a signature for the test work product. The user scans their biometric on a Biometric Scanner 404 which returns a Biometric Template. The Biometric Template is provided to a Trusted Service 406 e.g., smart card that implements the Biometric Template to key pair algorithm at Steps P and Q. The major feature of these algorithms is that they always recreate the exact same key pair. The Trusted Service 406 recreates the key pair (KP) and uses the key pair private key (KPPrK) to sign the HTUC at Step Q. The Trusted Service 406 then returns the signature to the Test Service 410 via Steps R and S. The Test Service 410 persists the signature of HTUC in the database associated with the test work product at Step T. The Test Service 410 reports test work product status as ready for evaluation at Step U. At a later time, the Test Service 410 evaluates the test work product and generates a score and/or a pass/fail result at Step V1 that is stored at Step V2. The Test Service 410 creates at steps V3 and V4 a test work product result certificate (TSSC) with the user's public key derived from their biometric template, retrieved from the UC stored in the DB, as part of the attributes and signs it with the Test Service key. At Step V5, the TSSC is stored in the database. At a later time, the user 402 requests the TSSC at Step W and the Test Service 410 retrieves at Step X the test work product result certificate (TSSC). At Step Y, the User 402 receives a Return TSSC deactivate Test from the Test Service 410.

Figure 6:
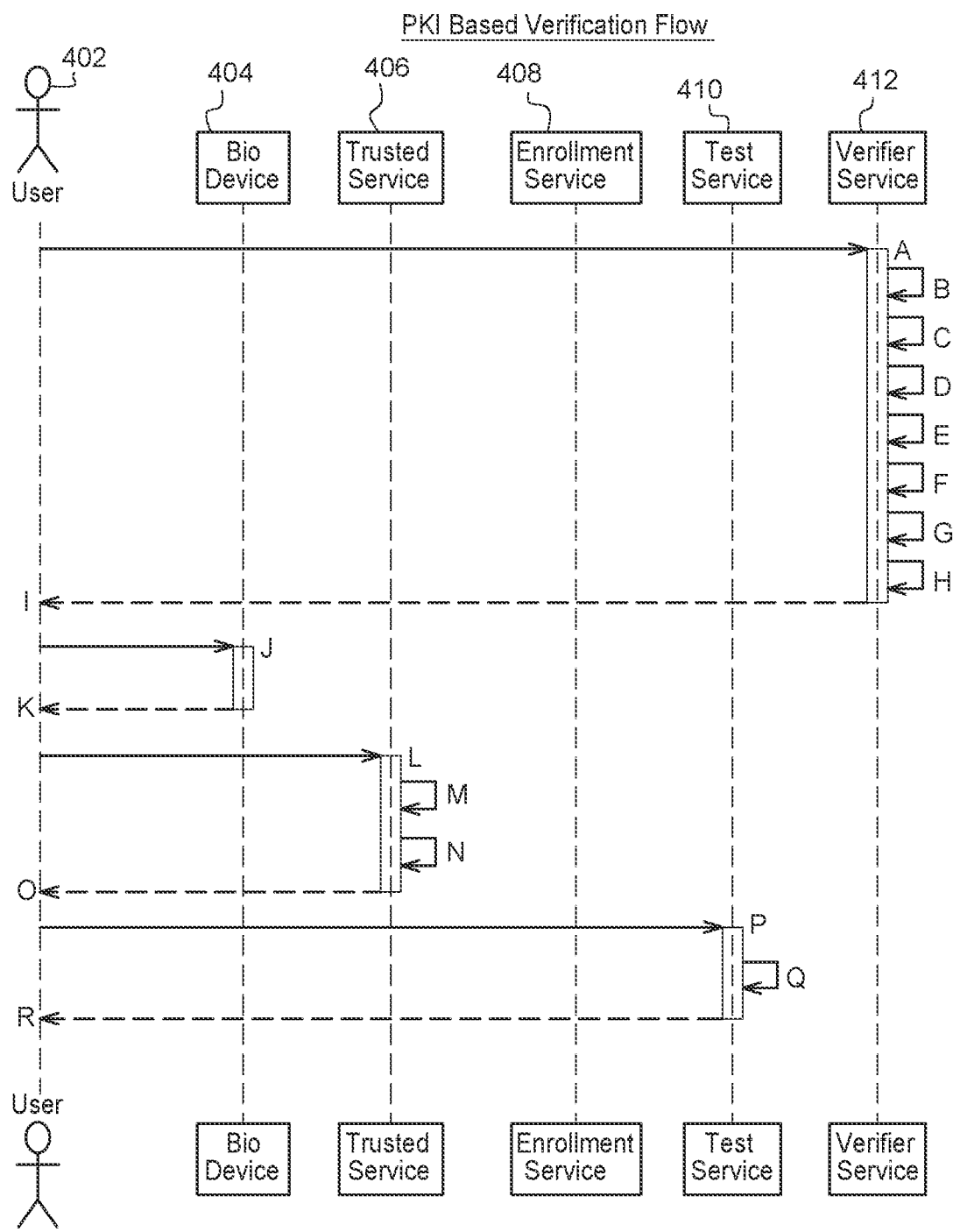
FIG. 6 is an illustration of the PKI based verification flow in accordance with the embodiments.

FIG. 6 is an illustration of an implementation or flow 600 for a PKI based verification using biometric to key pair transformation. The user 402 provides their test work product result certificate (TSSC) at Step A to a Verifier Service 412, e.g., Potential employer verifies user's grade given by a university certificate. The Verifier Service 412 examines the entire certificate trust chain for validity at Step B by extracting the SHTUC from the TSSC at Step C, extracting the UC from the TSSC at Step D, verifying the UC Trust chain at Step E, and extracting a public key (PuK) from the UC. If successful, the Verifier Service 412 generates a challenge (GC) at Step G and encrypts the GC (EGC) with the user's biometric public key at Step H, which is an attribute of the user's test work product result certificate, to create an encrypted generated challenge (EGC) and asks the user 402 at Step I to provide proof that the associated Certificate Public Key is indeed theirs by decrypting the challenge value and returning it. The user 402 scans their biometric on a Biometric Scanner 404 at Step J which returns a Biometric Template at Step K. The Biometric Template is provided at Step L to a trusted service 406 which recreates the KPPrK from the biometric template using the algorithm at Step M. The trusted service 406 decrypts the challenge at Step N using the recreated KPPrK and turns the decrypted challenge (DC) to the Verifier Service 412 for comparison via steps O, P, and Q. The Verifier (412) can then decide if the work product does or doesn't belong to the user 402. The status of the comparison is returned to the user 402 at Step R as shown.

FIG. 7 is an illustration of an implementation or flow 700 of enrollment using privacy preserving biometric transformation using a smart card as the trusted storage mechanism. Note, the usage of PKI and smart card are for illustration of secure transport. It is not required for the embodiments herein. Alternative techniques can be applied. In one embodiment, the user 402 requests enrollment at Step A to the Enrollment Service 408. The Enrollment Service 408 requests a Certificate Signing Request (CSR) at Step B that includes a biometric component. The user scans their biometric on a Biometric Scanner or device 404 at Step C which returns a Biometric Template at Step D to the User 402. The Biometric Template is provided to a trusted service 406, e.g., smart card at Step E that implements the Biometric Template to privacy preserving biometric algorithm at Steps E, F, G, and H. This innovation does not provide or claim privacy preserving biometric algorithm itself, but utilizes it as part of a new innovative concept. The Trusted Service 406 uses the privacy preserving biometric algorithm to convert the biometric template to a Biometric Public ID (BioPubID) at Step G. The Trusted Service 406 creates a Certificate Signing Request (CSR) at Step H using randomly generated key pair, embeds the Biometric Public ID and signs it with the key pair private key (KPPrK) persisted within the Trusted Service 406. The Trusted Service 406 at Step I can return the CSR using the Biometric Template. The Trusted Service 406 deletes the Biometric Template. The Certificate Signing Request (CSR) is transferred to the Enrollment Service 408 at Step J. The Enrollment Service 408 issues the biometric-based User Certificate (UC) embedded with the BioPubID at Step K and returns it at Step L to the user 402 for storage within the Trusted Service 406, e.g., smart card.

Figure 8:
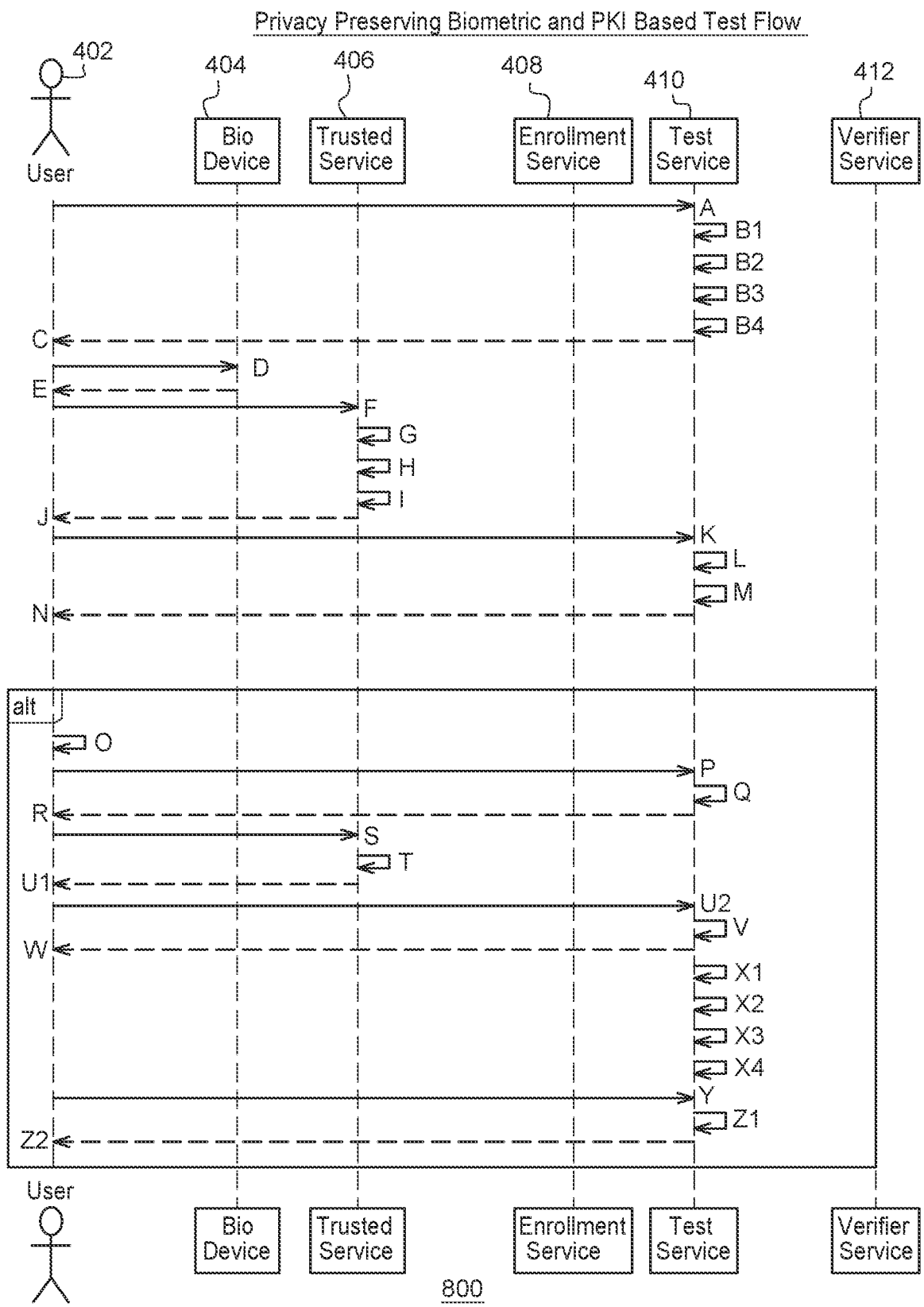
FIG. 8 is an illustration of the privacy preserving biometric and PKI based test flow in accordance with the embodiments.

FIG. 8 is an illustration of an implementation or flow 800 of work testing using privacy preserving biometric transformation. Before the user 402 does some work at the Test Service 410, they need to verify that they are the person registered to do that work. The user 402 presents their UC to the Test Service 410 at Step A. The Test Service 410 examines the entire certificate trust chain for validity at Steps B1, B2, B3, and B4. If successful, the Test Service 410 generates a challenge at Step B3 and encrypts it at Step B4 with the user's public key (KPPuK) extracted from the UC and asks the user 402 to provide proof at Step C that they have the associated private key (KPPrK), by decrypting the challenge value and returning it, and that the BioPubID is indeed theirs at Steps D, E, F, G, H and I. The user 402 scans their biometric on a Biometric Scanner or device 404 at Step D which returns a Biometric Template at Step E. The Biometric Template is provided to a Trusted Service 406 at Step F which creates a biometric cryptographic key (BioCK) from the biometric template using the algorithm at Step G. The Trusted Service 406 encrypts the Biometric Template with the BioCK at Step H. The Trusted Service 406 decrypts the challenge using the stored KPPrK at Step I and returns the Encrypted Biometric Template (EBT) and the decrypted challenge (DC) to the Test Service 410 viat Steps J and K for comparison. The Test Service 410 uses the Encrypted Biometric Template and the Biometric Public ID at Step L to do an operation at Step M to decide if the user is verified to do the work. The operation is an algorithm presented in a prior art. The decision is returned to the user 402 at Step N. If the user 402 is verified, then they can do the work at Step O. The user 402 does some work e.g., takes a test (T) and provides the work product to the Test Service 410 at Step P. The Test Service 410 persists the test work product (T) and the user certificate (UC) in a database (DB) and generates a hash of T and UC (TUC) at Step Q to be signed by the user 402 at Step R to create a signature. The user 402 scans their biometric on a Biometric Scanner or device 404 which returns a Biometric Template. The Biometric Template is provided to a Trusted Service 406 at Step S. The Trusted Service 406 signs the hash using the key pair private key (KPPrK) at Step T, generates a cryptographic key (BioCK)

from the Biometric Template, encrypts the Biometric Template using the cryptographic key (BioCK), and then returns the signature of HTUC and the encrypted Biometric Template (EBT) to the Test Service 410 via Steps U1 and U2. The Test Service 410 uses the encrypted Biometric Template and the Biometric Public ID to do an operation to verify user identity. The operation is an algorithm presented in a prior art. If the user is verified, then the Test Service 410 persists the signature of HTUC at Step V in the database associated with the test work product. The Test Service 410 reports test work product status as ready for evaluation Steps X1, X2, X3, and X4. At a later time, the Test Service 410 evaluates the test work product and generates a score and/or a pass/fail result at Step X3. The Test Service 410 creates a test work product result certificate (TSSC) with the user's BioPubID and UC as part of the attributes and signs it with the Test Service key. At a later time, the user 402 requests at Step Y and retrieves at Steps Z1 and Z2 the test work product result certificate (TSSC) from the Test Service 410.

Figure 9:
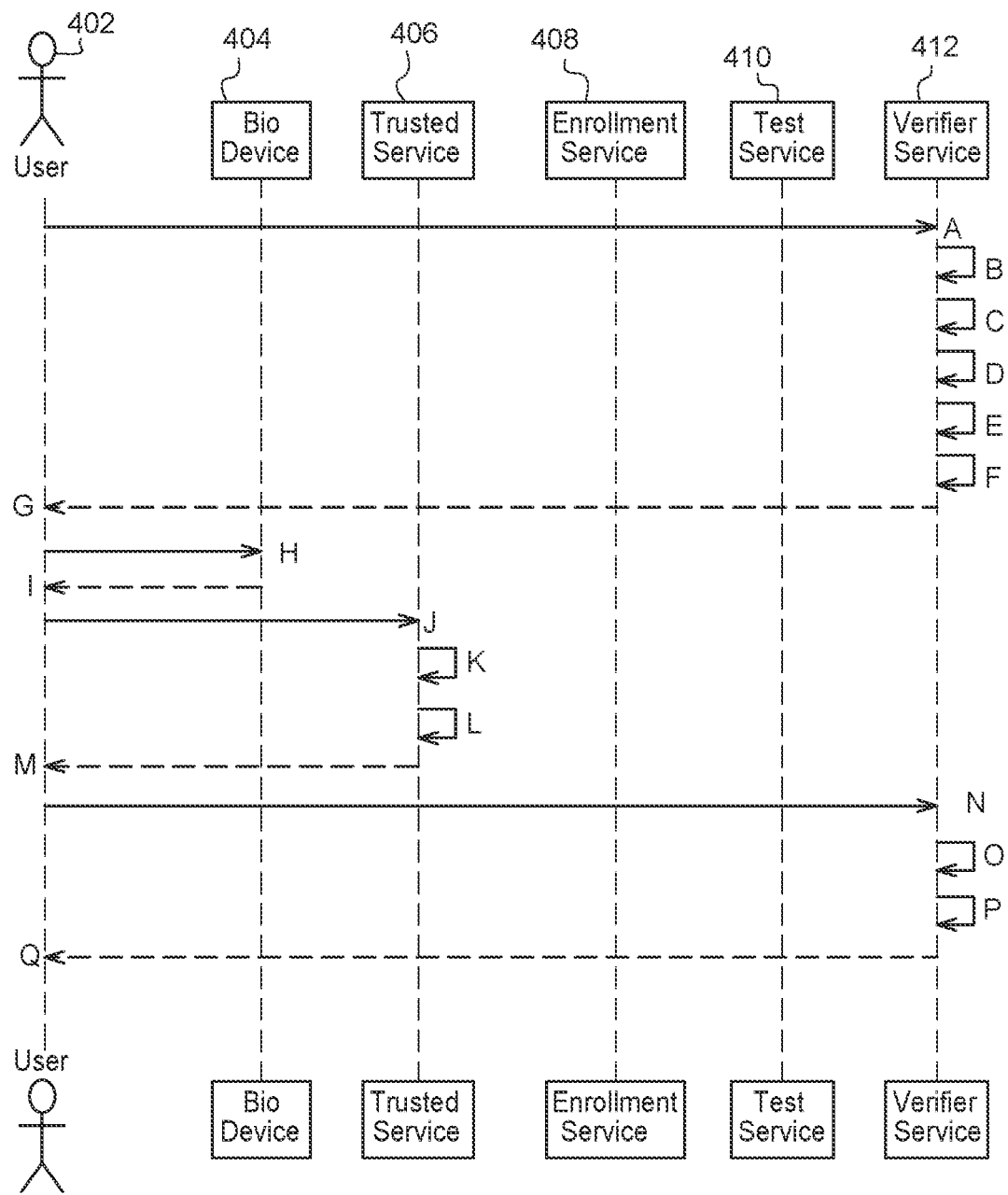
FIG. 9 is an illustration of the privacy preserving biometric and PKI base verification flow in accordance with the embodiments.

FIG. 9 is an illustration of implementation or flow 900 of verification using privacy preserving biometric transformation. The user 402 at Step A provides their test work product result certificate (TSSC) to a Verifier Service 412, e.g., where a potential employer wishes to verify a user's grade given by a university certificate. The Verifier Service 412 examines the entire certificate trust chain for validity at Steps B, C, D, E, and F. If successful, the Verifier Service 412 generates a challenge (GC) and encrypts it with the user's public key (KPPuK) extracted from the UC (at Step F) to create an encrypted generated challenge (EGC) and asks the user 402 at Step G to provide proof that they have the associated KPPrK, by decrypting the challenge value and returning it, and that the BioPubID is indeed theirs. The user 402 scans their biometric on a Biometric Scanner or device 404 at Step H which returns a Biometric Template at Step I. The Biometric Template is provided to a Trusted Service 406 at Step J which creates a biometric cryptographic key (BioCK) from the biometric template using the algorithm. The Trusted Service 406 encrypts the Biometric Template at Step L with the cryptographic key (BioCK). The Trusted Service 406 decrypts the challenge using the user's stored KPPrK and returns the encrypted biometric template (EBT) and the decrypted challenge (DC) via Steps M and N to the Verifier Service 412 for comparison. The Verifier or Verification Service 412 verifies a match between the generated challenge (GC) with the decrypted challenge (DC) at Steps O and P. The Verification Service 412 uses the Encrypted Biometric Template and the BioPubID in the test work product result certificate to do an operation at Steps O and P to decide if the BioPubID belongs to the user 402 at Step O. The operation is an algorithm presented in a prior art. The Verifier Service 412 can then decide if the work product does or doesn't belong to the user 402. The status of the comparison is returned to the user 402 at step Q.

The enrollment service 408 and testing service 410 can be a same entity.

FIG. 10 is an illustration of an implementation or flow 1000 of enrollment using privacy preserving biometric transformation without needing user-based PKI. The user 402 requests enrollment to the Enrollment Service 408 at Step A. The Enrollment Service 408 starts a Certificate Signing Request (CSR) at Step B that asks the user 402 for their biometric public ID (BioPubID) at Step C. The user 402 scans their biometric at Step D on a Biometric Scanner or device 404 which returns a Biometric Template at Step E. The Biometric Template is provided to a trusted service 406 at Step F that implements the Biometric Template to privacy preserving biometric algorithm. Again, this innovation does not provide or claim this algorithm by itself. The Trusted Service 406 uses the privacy preserving biometric algorithm to convert the biometric template to a Biometric Public ID (BioPubID) at Step G. The Trusted Service 406 deletes the Biometric Template. The Trusted Service 406 passes the BioPubID to the Enrollment Service 408 via the User at steps H and I. The Enrollment Service 408 completes the CSR by embedding the BioPubID and associating a randomly generated key pair and signs the CSR with the generated private key. The Enrollment Service 408 at Step J issues the User Certificate (UC) embedded with the BioPubID and returns it to the user 402 at Step K for storage within the Trusted Service 406 at steps L and M. The trusted Service 406 can then confirm the UC storage (at the Trusted Service) to the User 402 at Step N.

Figure 11:
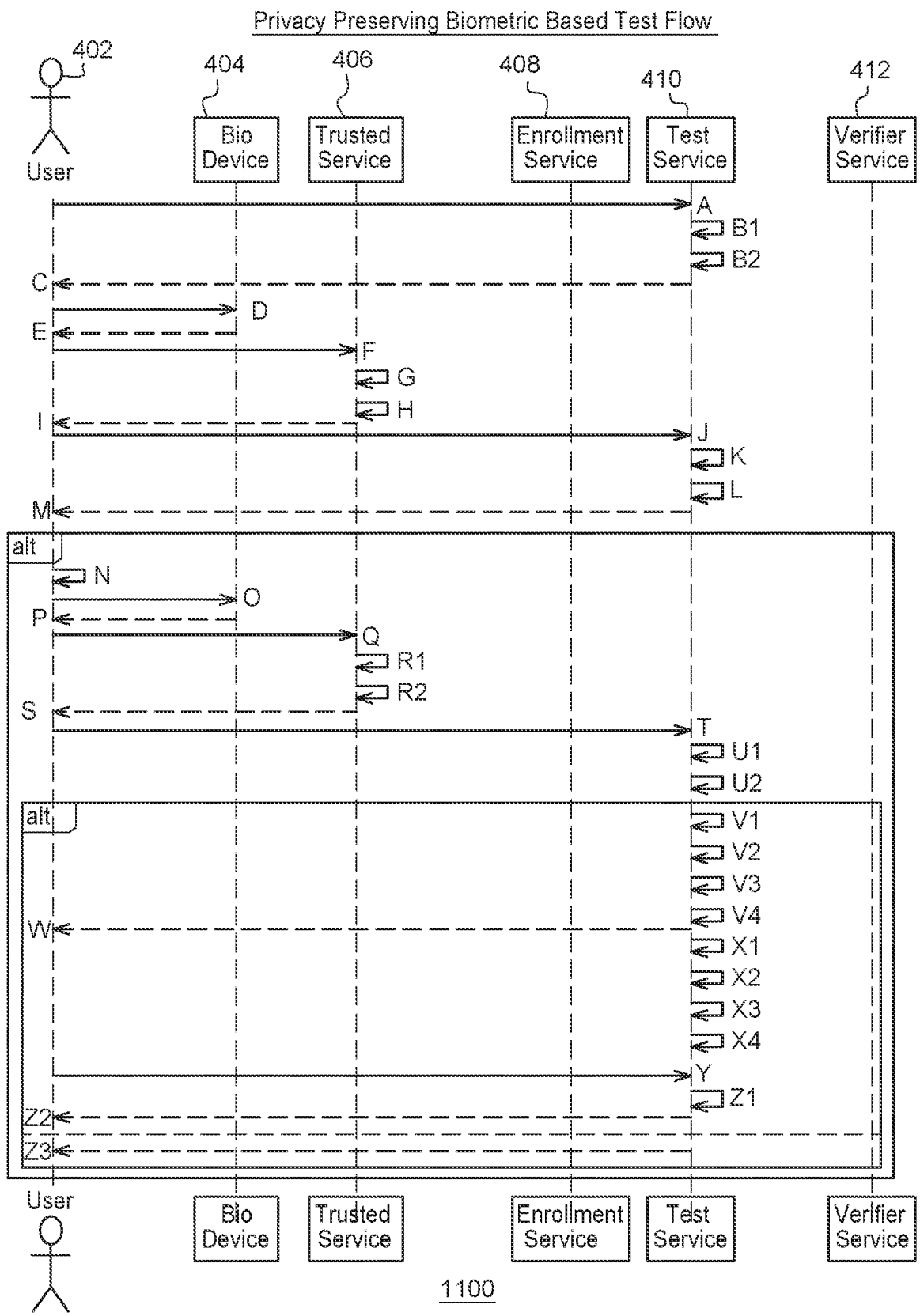
FIG. 11 is an illustration of the privacy preserving biometric based test flow in accordance with the embodiments.

FIG. 11 is an illustration of an implementation or flow 1100 of work testing using privacy preserving biometric transformation without needing user-based PKI. Before the user 402 does some work at the Test Service 410, they need to verify that they are the person registered to do that work. The user 402 presents their UC to the Test Service 410 at Step A. The Test Service 410 examines the entire certificate trust chain for validity at Step B1 and B2. If successful, the Test Service 410 asks the user 402 at Step C to provide proof that the BioPubID is indeed theirs. The user 402 scans their biometric on a Biometric Scanner or device 404 at Step D which returns a Biometric Template at Step E. The Biometric Template is provided to a Trusted Service 406 at Step F which creates a biometric cryptographic key (BioCK) from the biometric template using the algorithm at Step G. The Trusted Service 406 encrypts the Biometric Template (BT) with the BioCK at Step H resulting in an Encrypted Biometric Template (EBT). The Trusted Service 406 returns the EBT to the Test Service 410 for verification via Steps I and J. The Test Service 410 uses the EBT and the BioPubID to do an operation to decide if the user 402 is verified to do the work at Steps K and L. The operation is an algorithm presented in a prior art. The user validity decision is returned to the user 402 at Step M. If the user 402 is verified, then they can do the work.

The user 402 does some work e.g., take a test (T) at Step N.

The user 402 rescans their biometric on a Biometric Scanner or device 404 at Step O which returns a Biometric Template at Step P. The Biometric Template is provided to a Trusted Service 406 at Step Q which creates a biometric cryptographic key (BioCK) from the biometric template using the algorithm at Step R1. The Trusted Service 406 encrypts the Biometric Template (BT) at Step R2 with the BioCK resulting in an Encrypted Biometric Template (EBT) which the Trust Service returns to the User at Step S.

The user 402 submits their T, UC and EBT to the Test Service 410 at Step T for verification. The Test Service 410 uses the EBT and the BioPubID at Steps U1 and U2 to do an operation to decide if the user 402 is the same person or not. The operation is an algorithm presented in a prior art.

If the user 402 is verified, then the Test Service 410 persists or stores the T or test in a database (DB) at step V1. The Test Service creates a test work product certificate with the user's T, and UC as part of the attributes and signs it with the Test Service signing key at Steps V2, V3, and V4. The Test Service 410 persists the test work product certificate at step V4 in the database associated with the test work product.

The Test Service 410 reports test work product status as ready for evaluation at Step W.

If the user 402 is not verified, then the Test Service 410 reports test work product status as not ready for evaluation at Step Z3.

At a later time, the Test Service 410 evaluates the test work product and generates a score and/or a pass/fail result at Steps X1, X2, and X3. The Test Service creates at Step X3 a test work product result certificate (TSSC) with the result and the user's BioPubID and UC as part of the attributes and signs it with the Test Service key. The Test Service 410 stores the TSSC in a database at Step X4.

At a later time, the user 402 requests at Step Y the TSSC from the Test Service 410 and the Test Service 410 retrieves the test work product result certificate (TSSC) at Step Z1. The Test Service 410 can then return the TSSC to the User 402 at Step Z2.

Figure 12:
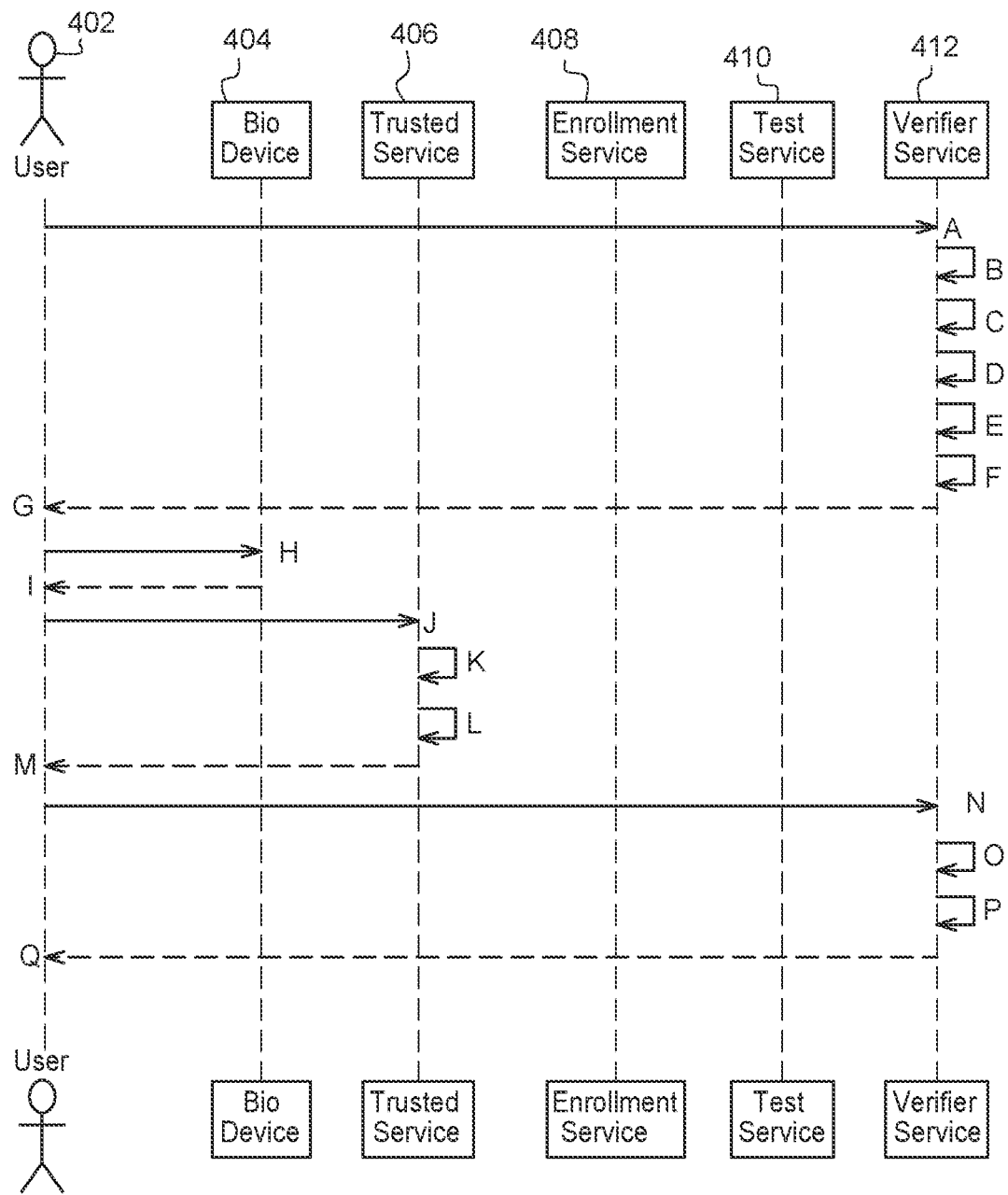
FIG. 12 is an illustration of the privacy preserving biometric base verification flow in accordance with the embodiments.

FIG. 12 is an illustration of implementation or flow 1200 of verification using privacy preserving biometric transformation without needing user-based PKI. The user 402 provides at Step A their test work product result certificate (TSSC) to a Verifier Service 412, e.g., a potential employer verifies user's grade given by a university certificate. The Verifier Service 412 examines the entire certificate trust chain for validity at Steps B, C, D, E, and F. If successful, the Verifier Service 412 asks the user 402 to provide proof that the BioPubID is indeed theirs at Step G. The user 402 scans their biometric at Step H on a Biometric Scanner or device 404 which returns a Biometric Template to the User 402 at Step I. The Biometric Template is provided to a Trusted Service 406 at Step J which creates a biometric cryptographic key (BioCK) from the biometric template using the algorithm at Step K. The Trusted Service 406 encrypts the Biometric Template (BT) with the BioCK at Step L resulting in an Encrypted Biometric Template (EBT). The Trusted Service 406 returns the EBT to the Verifier Service 412 for verification via the User via Steps M and N. The Verifier Service 412 uses the EBT and the BioPubID at Steps O and P to do an operation to decide if the user 402 is verified. The operation is an algorithm presented in a prior art. The Verifier Service 412 can then decide if the work product does or doesn't belong to the user 402. The status of the comparison is returned to the user 402 at Step Q.

The enrollment service 408 and testing service 410 can be a same entity.

In the absence of any specific clarification related to its express use in a particular context, where the terms "substantial" or "about" or "usually" in any grammatical form are used as modifiers in the present disclosure and any appended claims (e.g., to modify a structure, a dimension, a measurement, or some other characteristic), it is understood that the characteristic may vary by up to 30 percent.

The terms "include" and "comprise" as well as derivatives thereof, in all of their syntactic contexts, are to be construed without limitation in an open, inclusive sense, (e.g., "including, but not limited to"). The term "or," is inclusive, meaning and/or. The phrases "associated with" and "associated therewith," as well as derivatives thereof, can be understood as meaning to include, be included within, interconnect with, contain, be contained within, connect to or with, couple to or with, be communicable with, cooperate with, interleave, juxtapose, be proximate to, be bound to or with, have, have a property of, or the like.

Unless the context requires otherwise, throughout the specification and claims which follow, the word "comprise" and variations thereof, such as, "comprises" and "comprising," are to be construed in an open, inclusive sense, e.g., "including, but not limited to."

Reference throughout this specification to "one embodiment" or "an embodiment" or "some embodiments" and variations thereof mean that a particular feature, structure, or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

As used in this specification and the appended claims, the singular forms "a," "an," and "the" include plural referents unless the content and context clearly dictates otherwise. It should also be noted that the conjunctive terms, "and" and "or" are generally employed in the broadest sense to include "and/or" unless the content and context clearly dictates inclusivity or exclusivity as the case may be. In addition, the composition of "and" and "or" when recited herein as "and/or" is intended to encompass an embodiment that includes all of the associated items or ideas and one or more other alternative embodiments that include fewer than all of the associated items or idea.

In the present disclosure, conjunctive lists make use of a comma, which may be known as an Oxford comma, a Harvard comma, a serial comma, or another like term. Such lists are intended to connect words, clauses or sentences such that the thing following the comma is also included in the list.

As the context may require in this disclosure, except as the context may dictate otherwise, the singular shall mean the plural and vice versa. All pronouns shall mean and include the person, entity, firm or corporation to which they relate. Also, the masculine shall mean the feminine and vice versa.

When so arranged as described herein, each computing device or processor may be transformed from a generic and unspecific computing device or processor to a combination device comprising hardware and software configured for a specific and particular purpose providing more than conventional functions and solving a particular technical problem with a particular technical solution. When so arranged as described herein, to the extent that any of the inventive concepts described herein are found by a body of competent adjudication to be subsumed in an abstract idea, the ordered combination of elements and limitations are expressly presented to provide a requisite inventive concept by transforming the abstract idea into a tangible and concrete practical application of that abstract idea.

The headings and Abstract of the Disclosure provided herein are for convenience only and do not limit or interpret the scope or meaning of the embodiments. The various embodiments described above can be combined to provide further embodiments. Aspects of the embodiments can be modified, if necessary to employ concepts of the various patents, application and publications to provide further embodiments.

The invention claimed is:

1. A method of verifying an originator of an object using a biometric operation, that by way of:
one or more processors and memory coupled to the one or more processors, wherein the memory includes computer instructions which when executed by the one or more processors causes the one or more processors, to performs the operations of:
requesting a biometric certificate from an enrollment service;

capturing and receiving a biometric reading associated with a user;
transforming the biometric reading into a format that can be made public; and
creating a user's certificate containing the public biometric data;
wherein the user performs some work that generates some work product, with the user's work product assessed by a testing service, the testing service's testing result added within a signed result certificate, and wherein the user's work product is associated with a certificate of completion and designation of merit.

2. The method of claim 1, wherein the user certificate is verified by a verification service by performing the operations of:
presenting the user's certificate to the verification service;
capturing and receiving a biometric reading associated with the user;
transforming the biometric reading into a format that can prove the validity of the public biometric data; and
verifying the originator of the certificate if a proof is made with the public biometric data.

3. The method of claim 2, wherein the verification authority obtains the user's current biometrics and converts them into a format that can prove the validity of the public biometric data embedded in the user's certificate.

4. The method of claim 2, wherein the method of converting the biometric data further comprises generating a privacy preserving biometric cryptographic key from the biometric.

5. The method of claim 1, wherein the user provides additional personal
information for the certificate that further identifies the requester of the certificate.

6. The method of claim 5, wherein the user additional personal information is added to the issued certificate.

7. The method of claim 1, wherein the method of converting the biometric data further comprises generating a key pair from the biometric.

8. The method of claim 1, wherein the method of converting the biometric data further comprises generating a privacy preserving biometric public ID from the biometric.

9. The method of claim 1, wherein the biometric reading captured and received is any capturable biometric including but not limited to fingerprints, facial recognition, voice print, palm print, iris, or keystroke sequence captured securely during an examination of the user.

10. The method of claim 1, wherein the biometric public data is embedded with the test result to generate the signed result certificate.

11. The method of claim 10, wherein the signed result certificate further includes a QR code that allows access to the secure content upon scanning.

12. A method of verifying an originator of an object using a biometric operation, that by way of:
one or more processors and memory coupled to the one or more processors, wherein the memory includes computer instructions which when executed by the one or more processors causes the one or more processors, performs the operations of:
requesting a biometric certificate from an enrollment service;
capturing and receiving a biometric reading associated with a user;
transforming the biometric reading into a format that can be made public; and
creating a user's certificate containing the public biometric data,
wherein the method comprises converting the biometric reading to biometric public data, receiving a password to generate a key, and using the key to encrypt any personally identifiable information to provide encrypted personally identifiable information.

13. The method of claim 2, A method of verifying an originator of an object using a biometric operation, that by way of:
one or more processors and memory coupled to the one or more processors, wherein the memory includes computer instructions which when executed by the one or more processors causes the one or more processors, performs the operations of:
requesting a biometric certificate from an enrollment service;
capturing and receiving a biometric reading associated with a user;
transforming the biometric reading into a format that can be made public; and
creating a user's certificate containing the public biometric data,
wherein the user certificate is verified by a verification service by performing the operations of:
presenting the user's certificate to the verification service;
capturing and receiving a biometric reading associated with the user;
transforming the biometric reading into a format that can prove the validity of the public biometric data;
verifying the originator of the certificate if a proof is made with the public biometric data;
wherein the method comprises proving the validity of the public biometric data; receiving a password to generate a key, and using the key to decrypt any encrypted personally identifiable information to provide personally identifiable information.

14. A system of verifying an originator of an object using a biometric signature, comprising:
one or more processors and memory coupled to the one or more processors, wherein the memory includes computer instructions which when executed by the one or more processors causes the one or more processors to perform the operations of:
requesting a biometric certificate from an enrollment service;
capturing and receiving a biometric reading associated with a user;
transforming the biometric reading into a format that can be made public; and
creating a user's certificate containing the public biometric data,
wherein the user performs some work that generates some work product, with the user's work product assessed by a testing service, the testing service's testing result added within a signed result certificate, and wherein the user's work product is associated with a certificate of completion and designation of merit.

15. The system of claim 14, wherein the one or more processors are further configured to verify the user certificate by a verification service-by performing the operations of:
presenting the user's certificate to the verification service;
capturing and receiving a biometric reading associated with the user;
transforming the biometric reading into a format that can prove the validity of the public biometric data; and verifying the originator of the certificate if a proof is made with the public biometric data.

16. The system of claim 15, wherein the verification service obtains the user's current biometrics and converts them into a format that proves the validity of the public biometric data embedded in the user's certificate.

17. The system of claim 14, wherein the one or more processors are further configured to convert the biometric data by generating a key pair from the biometric.

\* \* \* \* \*